United States Patent [19]

Van Gils

[11] Patent Number: 4,713,816

[45] Date of Patent: Dec. 15, 1987

[54] THREE MODULE MEMORY SYSTEM CONSTRUCTED WITH SYMBOL-WIDE MEMORY CHIPS AND HAVING AN ERROR PROTECTION FEATURE, EACH SYMBOL CONSISTING OF 2I+1 BITS

[75] Inventor: Willibrordus J. Van Gils, Eindhoven, Netherlands

[73] Assignee: U.S. Philips Corporation, New York, N.Y.

[21] Appl. No.: 833,644

[22] Filed: Feb. 25, 1986

[51] Int. Cl.[4] .......................................... G06F 11/10
[52] U.S. Cl. ........................................ 371/38; 371/21
[58] Field of Search ............................. 371/37, 38, 39

[56] References Cited

U.S. PATENT DOCUMENTS

| | | | |
|---|---|---|---|
| 4,547,882 | 10/1985 | Tanner | 371/38 |
| 4,561,095 | 12/1985 | Khan | 371/38 |
| 4,562,576 | 12/1985 | Ratcliffe | 371/38 |
| 4,569,052 | 2/1986 | Cohn | 378/38 |
| 4,604,749 | 8/1986 | Shinoda | 371/38 |
| 4,617,664 | 10/1986 | Aichelmann et al. | 371/38 |

*Primary Examiner*—Michael R. Fleming
*Attorney, Agent, or Firm*—Jack E. Haken; James J. Cannon, Jr.

[57] ABSTRACT

A three module memory system is disclosed wherein a data word of $2^{i+1}$ bits is stored. Half of the data word is stored in each of two memory modules. A third memory module is provided, wherein each of the modules allows for storing symbols of $2^i+1$ bits. An error protection code is disclosed which for symbols of five bits has a minimum distance profile of (4, 2, 0) and for symbols of nine or seventeen bits has a minimum distance profile of (6, 2, 0). Thus a single bit error is correctable, a single symbol error is detectable, and up to four arbitrary bit errors are detectable. Also a simple and systematic decoder is disclosed.

8 Claims, 20 Drawing Figures

$$d(C|0) = \text{minimum} \{w(\underline{c}_1, \underline{c}_2, \underline{c}_3) : (\underline{c}_1, \underline{c}_2, \underline{c}_3) \in C \backslash \{\underline{0}\}\},$$

$$d(C|1) = \text{minimum} \{w(\underline{c}_1, \underline{c}_2), w(\underline{c}_1, \underline{c}_3), w(\underline{c}_2, \underline{c}_3) : (\underline{c}_1, \underline{c}_2, \underline{c}_3) \in C \backslash \{\underline{0}\}\},$$

$$d(C|2) = \text{minimum} \{w(\underline{c}_1), w(\underline{c}_2), w(\underline{c}_3) : (\underline{c}_1, \underline{c}_2, \underline{c}_3) \in C \backslash \{\underline{0}\}\}.$$

FIG. 1

$$M_b = \begin{bmatrix} m_{00} & m_{01} & m_{02} & \cdots & m_{07} \\ m_{10} & m_{11} & m_{12} & \cdots & m_{17} \\ \vdots & & & & \vdots \\ \vdots & & & & \vdots \\ m_{70} & m_{71} & m_{72} & \cdots & m_{77} \end{bmatrix}$$

FIG. 2

$$G = \begin{bmatrix} I & \underline{p}^T(I) & 0 & \underline{p}^T(0) & M & \underline{p}^T(M) \\ \hline 0 & \underline{p}^T(0) & I & \underline{p}^T(I) & M^2 & \underline{p}^T(M^2) \end{bmatrix}$$

FIG. 5

Basis $N_5$ :   M =

11001111
          10100111
          11110011
          11101001
          11111100
          01111010
          00111111
          10011110

Basis $N_{11}$:   M =

10111101
          10011110
          01101111
          10100111
          11011011
          11101001
          11110110
          01111010

Basis $N_{15}$:   M =

11011110
          00101111
          10110111
          11001011
          11101101
          11110010
          01111011
          10111100

Basis $N_{29}$:   M =

01001111
          11100111
          11010011
          11111001
          11110100
          01111110
          00111101
          10011111

Basis $N_{47}$ :   M =

01111001
          11111100
          01011110
          00111111
          10010111
          11001111
          11100101
          11110011

Basis $N_{53}$ :   M =

00111101
          11011110
          01001111
          10110111
          11010011
          11101101
          11110100
          01111011

Basis $N_{63}$ :   M =

11111001
          10111100
          01111110
          00101111
          10011111
          11001011
          11100111
          11110010

Basis $N_{87}$ :   M =

Basis $N_9$ :   M =

00001011
11000101
11000010
01110001
10110000
01011100
00101100
00010111

Basis $N_{21}$:   M =

00011010
01001101
10000110
01010011
10100001
11010100
01101000
00110101

Basis $N_{39}$:   M =

11101000
00110100
00111010
00001101
10001110
01000011
10100011
11010000

Basis $N_{43}$:   M =

10101100
00010110
00101011
10000101
11001010
01100001
10110010
01011000

Basis $N_{55}$ :   M =

10101100
00010110
00101011
10000101
11001010
01100001
10110010
01011000

Basis $N_{61}$ :   M =

10001011
10000101
11100010
01100001
10111000
01011000
00101110
00010110

Basis $N_{91}$ :   M =

00011010
01001101
10000110
01010011
10100001
11010100
01101000
00110101

Basis $N_{95}$ :   M =

$$G = \begin{bmatrix} 1\ldots\ldots 1 & \ldots\ldots\ldots & \ldots 1.111 \\ .1\ldots\ldots 1 & \ldots\ldots\ldots & 11\ldots 1.1. \\ ..1\ldots\ldots 1 & \ldots\ldots\ldots & 11\ldots\ldots 1.1 \\ \ldots 1\ldots\ldots 1 & \ldots\ldots\ldots & .111\ldots 1. \\ \ldots\ldots 1\ldots 1 & \ldots\ldots\ldots & 1.11\ldots\ldots 1 \\ \ldots\ldots 1..1 & \ldots\ldots\ldots & .1.111\ldots \\ \ldots\ldots\ldots 1.1 & \ldots\ldots\ldots & ..1.11..1 \\ \ldots\ldots\ldots 11 & \ldots\ldots\ldots & \ldots 1.111. \\ \ldots\ldots\ldots\ldots & 1\ldots\ldots 1 & 1\ldots 1.11. \\ \ldots\ldots\ldots\ldots & .1\ldots\ldots 1 & 1\ldots .1.11 \\ \ldots\ldots\ldots\ldots & ..1\ldots\ldots 1 & 111\ldots 1.. \\ \ldots\ldots\ldots\ldots & \ldots 1\ldots\ldots 1 & .11\ldots\ldots 11 \\ \ldots\ldots\ldots\ldots & \ldots\ldots 1\ldots 1 & 1.111\ldots \\ \ldots\ldots\ldots\ldots & \ldots\ldots 1..1 & .1.11\ldots 1 \\ \ldots\ldots\ldots\ldots & \ldots\ldots\ldots 1.1 & ..1.111.. \\ \ldots\ldots\ldots\ldots & \ldots\ldots\ldots 11 & \ldots 1.11.1 \end{bmatrix}$$

FIG. 6 a $$H = \begin{bmatrix} 111111111 & \ldots\ldots\ldots & \ldots\ldots\ldots \\ \ldots\ldots\ldots & 111111111 & \ldots\ldots\ldots \\ \ldots\ldots\ldots & \ldots\ldots\ldots & 111111111 \\ & & 1\ldots\ldots\ldots \\ & & .1\ldots\ldots\ldots \\ M^T & (M^2)^T & ..1\ldots\ldots \\ & & \ldots 1\ldots\ldots \\ & & \ldots\ldots 1\ldots\ldots \\ & & \ldots\ldots 1\ldots \\ & & \ldots\ldots 1\ldots \\ & & \ldots\ldots\ldots 1. \\ & & \ldots\ldots\ldots 1 \end{bmatrix}$$

FIG. 6 b $$U = \begin{bmatrix} 111111111 & \cdots\cdots\cdots & \cdots\cdots\cdots \\ \cdots\cdots\cdots & 111111111 & \cdots\cdots\cdots \\ \cdots\cdots\cdots & \cdots\cdots\cdots & 111111111 \\ .11.1\ldots & 111.1\ldots & 1\ldots\ldots \\ .111.1\ldots & ..11.1\ldots & .1\ldots\ldots \\ \ldots 11.1.. & ..111.1.. & ..1\ldots\ldots \\ \ldots 111.1. & \ldots 11.1. & \ldots 1\ldots \\ 1\ldots .11. & 1\ldots 111.. & \ldots .1\ldots \\ .1\ldots 111 & .1\ldots .11. & \ldots\ldots 1.. \\ 1.1\ldots .1. & 1.1\ldots 11. & \ldots\ldots 1. \\ 11.1\ldots 1. & 11.1\ldots\ldots & \ldots\ldots 1. \end{bmatrix}$$

FIG. 6c

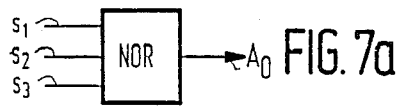 FIG. 7a

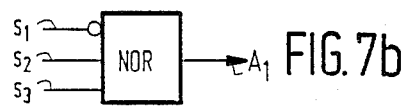 FIG. 7b $$\underline{u}_1 = \begin{bmatrix} 0\\0\\0\\0\\0\\1\\0\\0\\1\\1 \end{bmatrix} \quad \underline{v}_1 = \begin{bmatrix} 1\\0\\0\\0\\0\\1\\0\\0\\1\\1 \end{bmatrix} \quad \underline{w}_1 = \begin{bmatrix} 1\\0\\0\\0\\0\\0\\0\\0\\1\\0 \end{bmatrix}$$

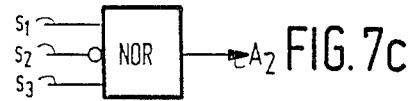 FIG. 7c

FIG. 8a    FIG. 8b    FIG. 8c

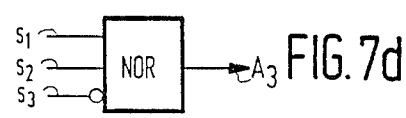 FIG. 7d $X_1 := (s_5 + s_6 + s_7 + s_9) = (\overline{\overline{s}_5 \overline{s}_6 \overline{s}_7 \overline{s}_9})$, $Y_1 := (\overline{s}_8 + \overline{s}_{10} + \overline{s}_{11}) = (\overline{s_8 s_{10} s_{11}})$, $Z_1 := (s_8 + s_{10} + s_{11}) = (\overline{\overline{s}_8 \overline{s}_{10} \overline{s}_{11}})$, $B_1 := (\overline{\overline{s}_4 + X_1 + Y_1})$, $C_1 := (\overline{s_4 + X_1 + Y_1})$, $D_1 := (\overline{s_4 + X_1 + Z_1})$, $SE_1 := A_1 B_1$, $SE_{10} := A_2 C_1$, $SE_{19} \quad A_3 D_1.$

FIG. 9

$$G = \begin{bmatrix} I & \underline{p}^T(I) & 0 & \underline{p}^T(0) & M & \underline{p}^T(M) \\ \hline 0 & \underline{p}^T(0) & I & \underline{p}^T(I) & M^2 & \underline{p}^T(M^2) \end{bmatrix}$$

$$G = \begin{bmatrix} I & \underline{p}^T(I) & 0 & \underline{p}^T(0) & M & \underline{p}^T(M) \\ \hline 0 & \underline{p}^T(0) & I & \underline{p}^T(I) & M^2 & \underline{p}^T(M^2) \end{bmatrix}$$

THREE MODULE MEMORY SYSTEM CONSTRUCTED WITH SYMBOL-WIDE MEMORY CHIPS AND HAVING AN ERROR PROTECTION FEATURE, EACH SYMBOL CONSISTING OF 2I+1 BITS

BACKGROUND OF THE INVENTION

The invention relates to a system memory constructed with symbol-wide memory chips and having an error protection feature. Developments in memory technology have resulted in storage chips accommodating multiple data bits per memory location in each chip with corresponding multiple outputs. Errors in the storage of data in these memories are generally classified as occurring due to two distinct causes. One is a non-destructive environmental phenomenon caused by impingement of atomic alpha particles. Those particles, present in ordinary background atomic radiation, have energy values vis-a-vis the data signal stored in the cell. When such cells are struck by atomic alpha particles, the binary values stored in the cell may flip to an opposite value. Hence a data error occurs. These errors are therefore transient and usually influence a single bit at a time. These failures at small values of the minimum circuit detail occur relatively often.

The second major cause of error is the actual physical failure of one of the memory components. This failure produces a permanent or "hard" error. In general, the latter category of errors occurs relatively infrequently. On the other hand, such errors can influence any number of bits in a symbol, and therefore have more dramatic impact. Now, usually symbols are $2^i$ bits wide, wherein i may have values of 1 ... 4. Furthermore memory chips with symbols of $(2^i+1)$ bits (i.e. $2^i$ data bits plus one parity bit) have been manufactured, so that on the level of a memory chip a single bit error in a symbol may be detected. The present invention makes use of the latter type of memory chips, while extending the amount of error protection.

SUMMARY OF THE INVENTION

Thus, there is a requirement in such memory systems to detect and correct all single bit errors in a memory word consisting of three symbols, to detect all errors wherein a single symbol in a word has any number of bit errors (up to a fully inverted byte), and furthermore to detect as many coexistent single bit errors occurring in different symbols of the same word.

The object of the invention is attained by a three module memory system, each module having an equal number of memory symbol locations, each memory symbol location having an equal number of $2^i+1$ memory bit locations, a memory word thus containing $3(2^i+1)$ bits with $3 \leq i$, said memory system comprising input means for receiving user words of $2^{(i+1)}$ bits, encoding means fed by said input means for multiplying a user word received by a generator matrix (GO) to produce a memory word for storing in three corresponding memory symbol locations, wherein $(GO)=(P)\times(G)\times(Q)$, wherein (P) is an arbitrary regular matrix of dimensions $(2^{i+1})\times(2^{i+1})$, (Q) is an arbitrary permutation matrix of dimensions $\{3\times(2^i+1)\}\times\{3\times(2^i+1)\}$ for effecting bit-wise permutation within a code symbol and/or symbol-wise permutation within a code word, the choice for (P) and (Q) including identity matrices, and wherein G is a matrix for implementing a bitwise systematic error protection code having a minimum distance profile of (p, 2, 0) wherein p is at least equal to five. The invention provides a large class of [51, 32] and [27, 16] codes capable of correcting single bit errors, to detect up to four bit errors or to detect single memory chip failures, and also a class of [15, 8] codes capable of correcting single-bit errors, to detect up to two bit errors or to detect single memory chip failures. Furthermore, the present invention presents a convenient method for generating codes that have two, three, or four single bit error detecting capabilities. The constructed codes are optimal in the sense that there are no [27, 16] or [15, 8] codes having better correction/detection properties than the best codes presented hereinafter. Also, the [51, 32] code is close to optimum.

RELEVANT STATE OF THE ART

As a particular state of the art we cite EP patent application No. 100 825, corresponding to U.S. patent application Ser. No. 391,062 now abandoned which discloses a single bit error correction, double bit error detection, single byte error detection system in a memory word of three symbols of nine bits each. Thus, the present invention provides an improved error protection: up to four bit errors, instead of only two. Moreover, our coding scheme allows for simpler decoders using less hardware than necessary for the prior art realization. Further advantageous aspects of the invention are recited in the dependent claims.

BRIEF DESCRIPTION OF THE DRAWINGS

In the following disclosure, first definitions and preliminaries are given, next the construction of a [27, 16] code is extensively given, thereafter encoder and decoder implementations, and finally the construction of [15, 8] and [51, 32] codes. The disclosure is made by referring to the following Figures:

FIG. 1 gives a definition of a minimum distance profile;

FIG. 2 shows a binary matrix for a normal base of $GF(2^8)$;

FIGS. 3, 4 give matrices Mb for each of the sixteen normal bases of $GF(2^8)$;

FIG. 5 shows a symbolic generator matrix G;

FIGS. 6a, 6b, 6c show an actual generator matrix, a symbolic parity check matrix and an actual parity check matrix, respectively;

FIGS. 7a–d show the generation of signals A0 ... A3;

FIGS. 8a–8c show exemplary vectors $\underline{u}_1$, $\underline{v}_1$, $\underline{w}_1$;

FIG. 9 defines further intermediate signals;

DEFINITIONS AND PRELIMINARIES

Figures 10, 12A, 12B:
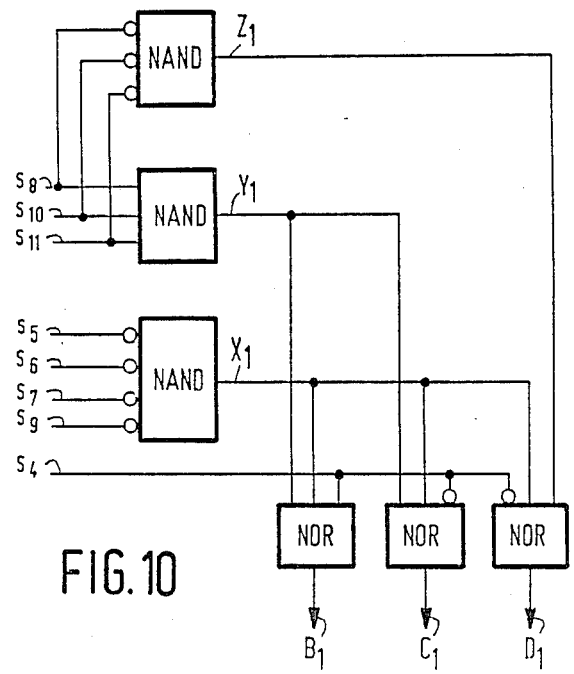
FIG. 10 gives the generation of signals B1, C1, D1.

By $w(\underline{x})$ we denote the Hamming weight of a binary vector $\underline{x}$, i.e. the number of components (bits) in x having the value 1. The length of a code is the number of bits in a code word, the dimension is the number of (non-redundant) data bits derivable from a code word. For a binary linear [3 m, k] code C of length 3 m and dimension k, such that all codewords $\underline{c}$ in C are partioned into three symbols $\underline{c}_1$, $\underline{c}_2$, $\underline{c}_3$ of length m, $\underline{c}=(\underline{c}_1, \underline{c}_2, \underline{c}_3)$, the minimum distance profile $d(C)=(\bar{d}(C|0), \bar{d}(C|1), \bar{d}(C|2))$ is defined in FIG. 1. The first component of the minimum distance profile is the minimum weight in bits of the code. The second component of the minimum distance profile is the minimum weight of the partial code, where in each code word the "heaviest" code symbol had been deleted, and so on. The profile thus has as many relevant elements as there are symbols in a code word. Each following element of the profile cannot be higher than any preceeding element of the profile. Any number of elements of the profile may be equal to zero.

Now, in the reference given supra a [27, 16] binary linear code is constructed having code words consisting of three symbols of 9 bits, and having minimum distance profile (4, 2, 0). This minimum distance profile quarantees the following properties for the code:
*single bit error correction,
*double bit error detection,
*single symbol error detection.

The minimum distance for the whole code is four: this is enough for single bit error correction, double bit error detection. The next element of the minimum distance profile is 2: this means that an arbitrary error in any one symbol is detectable. On the other hand, if one symbol would be left out of consideration (erasure symbol), this would mean single bit-error detection capability left. The latter feature is not used herein, however.

In the following paragraph we shall construct [27, 16] binary linear codes having codewords consisting of three symbols of 9 bits each, and having minimum distance profile (6, 2, 0). This minimum distance profile quarantees the following properties for the code:
*single bit error correction,
*double bit error detection,
*triple bit error detection,
*quadruple bit error detection,
*single symbol error detection.

Taken in isolation, the first element "6" of the minimum distance profile would also allow for correction of two single bit errors and detection of three single bit errors. This latter stratagem could, however, endanger the feature of single symbol error detection. Thus, it was felt, that the error protection measured out hereabove would be more useful in memory management.

The codes generated are optimal in the sense that any [27, 16] binary linear code having code words consisting of three symbols of 9 bits has a minimum distance profile (a, b, c) such that $a \leq 6$, $b \leq 2$, $c=0$. Moreover, from the specific example codes given, numerous other codes may be constructed having either the same, or lesser error protection capabilities, but therein still surpassing the capabilities of the prior art cited herebefore. In as far as the capability is smaller, such codes may be generated by superposing one or two noise bits on the generator matrix and then checking for the correct remaining protection level. It is believed that the code given hereinafter is also optimum for easy decoding.

CONSTRUCTION OF [27, 16] CODES HAVING MINIMUM DISTANCE PROFILE (6, 2, 0)

The generator matrix of the code may be written as $$G = \begin{pmatrix} M0 & M1 & M2 \\ M3 & M4 & M5 \end{pmatrix},$$

wherein each matrix Mi (i=0 ... 5) consists of $2^i$ rows and $2^i+1$ columns. General code theory such as given in F. J. Mac Williams et al., "The theory of error correcting codes", Amsterdam 1977 is considered as representing the general state of the art.

The codes are constructed as follows: Let a be a zero of the primitive polynomial $p(x)=x^8+x^4+x^3+x^2+1$ over GF(2). Define c to be $c=a^{85}$. a is a primitive element of $GF(2^8)$. This finite field has 16 normal bases $N_b := \{a^{b2^i} : i=0, 1, 2, 3, 4, 5, 6, 7\}$ for b=5, 9, 11, 15, 21, 29, 39, 43, 47, 53, 55, 61, 63, 87, 91, 95. These values are taken from the litterature on coding theory. $GF(2^4)$ has two normal bases, $GF(2^{16})$ has a multitude thereof; see Peterson & Weldon, Theory of Error Correcting Codes, MIT 1975 (2nd ed.). Instead of the above choice for $c=c^2=a^{170}$ would do as well; note that 85=255:3. Now, for each of these normal bases we define an 8 by 8 binary matrix $M_b$ as shown in FIG. 2.

In this matrix, $m_{ij}$, i,j in {0, 1, ... 7} are defined by the relations $$ca^{b2^i} = \sum_{j=0}^{7} m_{ij} a^{b2^j},$$

i=0, 1, ..., 7.

This means that $(m_{i0}, m_{i1}, \ldots, m_{i7})$ is the binary representation of $ca^{b2^i}$ with respect to the normal basis $N_b$.

These matices $M_b$ satisfy the relations $M_b^3 = I$ and $I+M_b+M_b^2=0$. In FIG. 3 the matrices $M_b$ are given for b in a set $A_5 := \{5, 11, 15, 29, 47, 53, 63, 87\}$. FIG. 4 gives the matrices $M_b$ for b in a set $A_4 := \{9, 21, 39, 43, 55, 61, 91, 95\}$.

We need the following properties:
*Property 1:
The [16, 8] binary linear codes with generator matrix [I $M_b$] for b in $A_5$ have minimum bit distance 5. This can be shown by straightforward checking.
*Property 2:
The [16, 8] binary linear codes with generator matrix [I $M_b$] for b in $A_4$ have minimum bit distance 4. The code words of weight 4 have one component equal to 1 in the first eight positions and three components equal to 1 in the last eight positions or vice versa.
*Proof:
This is easy to check by using the matrices given in FIG. 4. For a binary matrix A, let $p^T(A)$ denote the column vector of the row-parities of A, i.e.
$p(A)_i = \Sigma_j A_{ij}$.
Now we state the following theorem.
*Theorem 3:
For b in $A_4$ or $A_5$, $M := M_b$, the [27, 16] binary linear code C with generator matrix shown in FIG. 5, has minimum distance profile (6, 2, 0) if each code word of C is considered as being three symbols of 9 bits (I denotes the 8 by 8 identity matrix, 0 denotes the 8 by 8 all zero matrix).
*Proof:
From the properties 1 and 2 it follows that the [16, 8] code with generator matrix $[Ip^T(I) | Mp^T(M)]$ has minimum bit distance 6. Since $[M^2I] = M^2[IM]$, also the code with generator matrix $[Ip^T(I) | M^2p^T(M^2)]$ has minimum bit distance 6. Now let $\underline{c}=(\underline{c}_1, \underline{c}_2, \underline{c}_3)=(\underline{m}_1, \underline{m}_2) G$ be a code word of the code $\bar{C}$, where $\underline{c}_1, \underline{c}_2,$ and $\underline{c}_3$ are binary vectors of length 9 and $\underline{m}_1$ and $\underline{m}_2$ are vectors of length 8. We distinguish three cases:
A. $\underline{m}_1 \neq 0$, $\underline{m}_2 = 0$. Then $\underline{c} = \underline{m}_1[Ip^T(I) | 0p^T(0) | Mp^T(M)]$. Hence $w(\underline{c}) \leq 6$.

B. $m_1=\underline{0}$, $m_2\neq\underline{0}$. Then $\underline{c}=\underline{m_2}[I\underline{p}^{T-}(I)|0\underline{p}^T(\underline{0})|\overline{M^2}\underline{p}^T(\overline{M^2})]$.
Hence $w(\underline{c})\leq 6$.

C. $\underline{m_1}\neq\underline{0}$, $\underline{m_2}\neq\underline{0}$
  C1. If $\underline{c_3}\neq\underline{0}$ then $w(\underline{c_i})\leq 2$ for $i=1, 2, 3$. So $w(\underline{c})\leq 6$.
  C2. If $\underline{c_3}=\underline{0}$ then $\underline{m_1}=\underline{m_2}M$, and hence $\underline{c}=(\underline{m_2}M\ \underline{p}(\underline{m_2}\overline{M})|\underline{m_2}\underline{p}(\underline{m_2})|\overline{0}\overline{0})$. $w(\underline{c})=w(\underline{m_2}[M,\ \underline{p}^T(\overline{M})|I,\ \underline{p}^T(I)])\leq 6$.

From these observations it follows that the code C has minimum distance profile (6, 2, 0). FIGS. 6a, 6b, 6c give the actual generator matrix, G and parity check matrix H, of a code so derived. Herein we have chosen for b the value 9 (FIG. 4, first case). Furthermore, for clarity instead of binary zeroes, dots were used in a parity check matrix of the code construction in Theorem 3.

In general, the code generator matrix can be written as a product of three matrices $[P]\times[G]\times[Q]$. Herein, [P] is any $16\times 16$ regular matrix, [G] a $16\times 27$ generator matrix as constructed hereinabove, or along a similar reasoning for any of the other normal bases, or modified in such a way as to lose only a limited part of the error protection capability. Q is a $27\times 27$ permutation matrix. This latter matrix consists of 3 rows and 3 columns of submatrices the latter each being a $9\times 9$ submatrix. The $9\times 9$ submatrices are positioned in such a way that each row or column of three submatrices has exactly one subpermutation matrix that is non-zero, all other submatrices consisting exclusively of zeroes. Each subpermutation matrix operates on exactly one associated symbol. Each row and each column of any subpermutation matrix consists of eight zeroes and exactly a single one.

The parity check matrix so derived can be used for syndrome decoding of the code. The all-zero syndrome indicates a correct code word. The 27 syndromes of single bit errors are used for correcting the associated errors. There are 2048-1-27=2020 remaining syndromes. These are used for detecting all single symbol errors, all double, triple and quadruple bit errors, while also the larger part of any other error configurations (but not all of these). In fact, it is quite improbable for any error configuration outside the above list to produce any of the 28 syndrome configurations that would ultimately give a correct user word (even if all error patterns have equal probability the probability thereof would not be more than about 28/2048, that is about $1\frac{1}{2}\%$). The decoder may be implemented as in FIG. 2 of the reference, using 27 11-way AND-gates. But an implementation using less hardware is described in the next section.

Furthermore it should be remarked that the codes constructed in Theorem 3 are optimal, in the sense that for any [27, 16] binary linear code having code words consisting of three symbols of 9 bits the minimum distance profile (a, b, c) would satisfy $a\leq 6$, $b\leq 2$, $c=0$. This applies because any [27, 16] binary linear code has a minimum bit distance less than or equal to 6, and an [18, 16] binary linear code has a minimum bit distance of less than or equal to 2.

ENCODER AND DECODER IMPLEMENTATION

In this section we describe the encoder and decoder implementation of a [27, 16] code (in which each code word is considered to be composed of three symbols of 9 bits) constructed hereinbefore by taking b=9. A generator matrix G of this code is given in FIG. 6a. From this follows a straightforward construction of the encoder, which only needs to implement matrix multiplication operations. A parity check matrix H of this code is given in FIG. 6c. From FIG. 6c we see that the parity check matrix H has a nice structured form. In fact only two blocks of $8\times 8$ elements of irregular layout occur. This structured form is used in the decoder design. Define $\underline{s}=\underline{s}(r)$ to be the syndrome of a received vector $\underline{r}$:

$$\underline{s}=(s_1, s_2 \ldots, s_{11})^T=H\underline{r}^T.$$

The syndromes $\{\underline{s}=He^T|w(\underline{e})=1\}$ are used for single bit error correction. The remaining nonzero syndromes are used for error detection, without thereby specifying the nature of the error.

Define the signals $A_0, A_1, A_2, A_3$ as follows:
$A_0=\bar{s}_1\bar{s}_2\bar{s}_3$,
$A_1=s_1\bar{s}_2\bar{s}_3$,
$A_2=\bar{s}_1s_2\bar{s}_3$,
$A_3=\bar{s}_1\bar{s}_2s_3$.

Herein, syndrome bits $s_1, s_2, s_3$ in fact are parity bits over the associated code symbol and $\bar{s}_i$ is the inverse value of $s_i$. Their implementation using NOR-gates is given in FIGS. 7a-7d. If no error occurs then $A_0=1$. If a single bit error occurs then $A_1, A_2, A_3$ point to the symbol in which it occurs: $A_i=1$ if this single bit error is in symbol i. Now consider the vectors $\underline{u}_j, \underline{v}_j, \underline{w}_j$ of length 8 being the last 8 bits of the respective syndromes resulting from the single bit errors in positions j, j+9, and j+18 respectively (j=1, 2, . . . , 8). Because $M^2=I+M$ it holds that $\underline{u}_j$ and $\underline{v}_j$ only differ in one position and their difference is exactly $\underline{w}_j$. We use this fact in the construction of the decoder. For example, for j=1, the vectors $\underline{u}_1, \underline{v}_1, \underline{w}_1$ have the forms shown in FIGS. 8a, 8b, 8c, i.e. they correspond to the respective first columns of the $8\times 9$ lower matrices in FIG. 6c.

FIG. 9 defines the further intermediate signals $X_1, Y_1, Z_1, B_1, C_1, D_1, SE_1, SE_{10}, SE_{19}$. The first six of these serve for detecting the above vectors $\underline{u}_1, \underline{v}_1, \underline{w}_1$, while aiming for a low number of gates to be used. Thus, $\overline{X}_1$ signals the four zeroes in $\underline{v}_1$. Further, $\overline{Y}_1$ signsls the three ones in $\underline{u}_1$. Finally, $\overline{Z}_1$ signals that none of these latter three ones occurs. The complete detection of $\underline{u}_1, \underline{v}_1, \underline{w}_1$ is done by the signals $B_1, C_1, D_1$. Checking for occurrence in the correct symbol is done by signals $SE_1$ (Single error), $SE_{10}, SE_{19}$. Thus, if one bit error occurs at postion 1 then $SE_1=1$, if one bit error occurs at position 10 then $SE_{10}=1$, if one bit error occurs at position 19 then $SE_{19}=1$.

An implementation of the above formulas $X_1, Y_1, Z_1, B_1, C_1, D_1$ is given in FIG. 10. The inputs of the box are the 8 bits $s_4, s_5, \ldots, s_{11}$ of the syndrome vector. The outputs of the box are the three bits $B_1, C_1, D_1$. The internal of the box consists of three NAND-gates and three NOR-gates and is two gates deep. This box is called BOX 1. Other implementations with other gates are possible, we only provide one possibility. From the lay out of the matrix (H) in FIG. 6c the generation of signals $B_2\ldots_8, C_2\ldots_8, D_2\ldots_8$ is now straightforward; the number of NAND-gates required for each set could vary.

DESCRIPTION OF A COMPLETE DECODER

Figure 11:
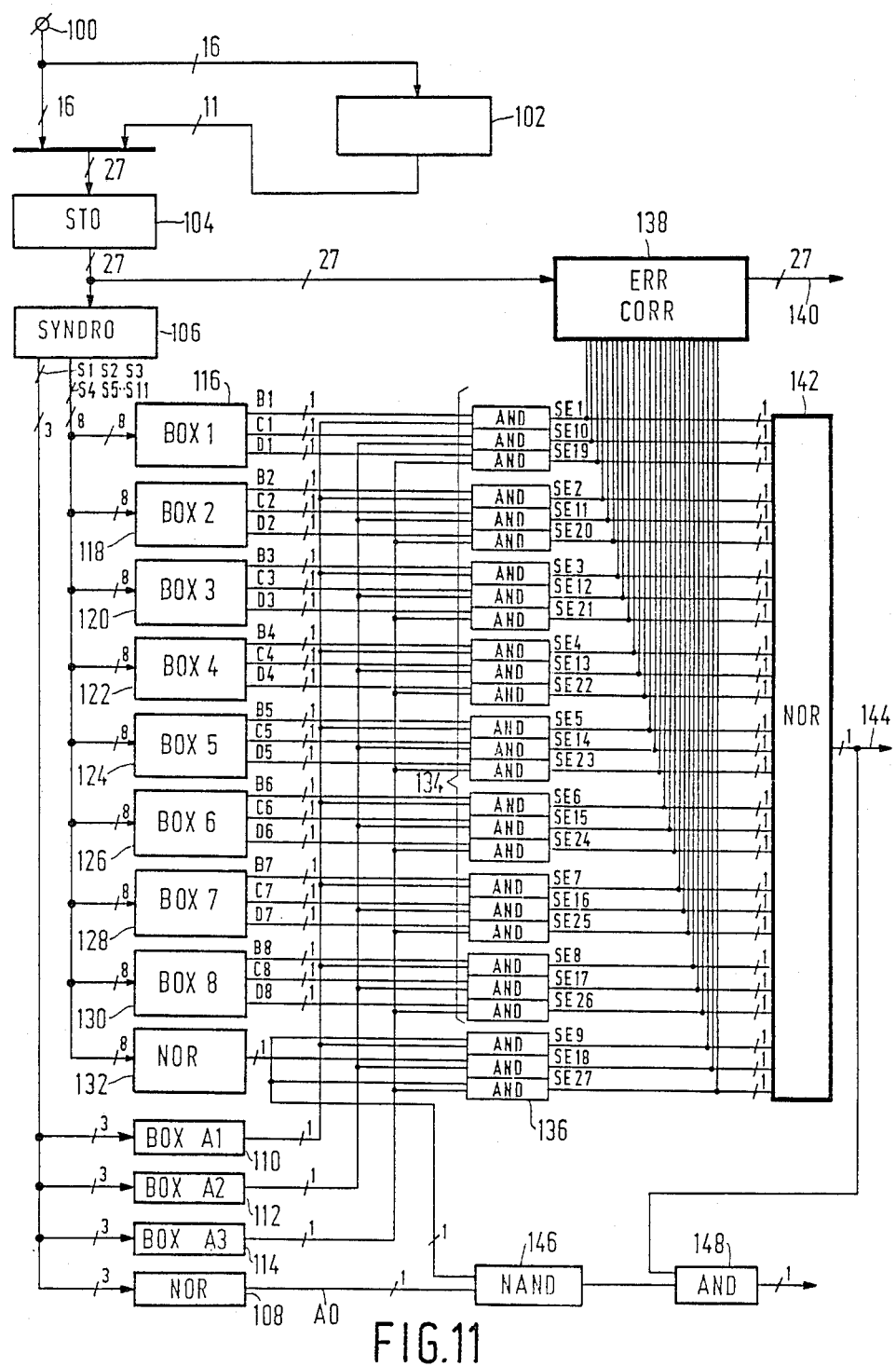
FIG. 11 gives a complete decoder for the [27, 16] code.

FIG. 11 gives a complete (de)coder of the [27, 16] code given herebefore. On input 100 the sixteen bit wide user data arrive. Element 102 is the check bit generator, wherein the eleven check bits, inclusive of the three symbol-wise parity bits are produced. Note that the code is systematic on two levels, in that the user bits are not changed, and also in that the eight non-parity bits are themselves part of a [9, 8] systematic code symbol. If a non-systematic code were used, element 102 would have more outputs (anywhere from 12 through 27). Element 104 is the three module memory system. Note that the memory may consist of a plurality of memory banks, each bank consisting of three memory modules.

At the output of memory 104, syndrome generator 106 by means of matrix multiplication generates the eleven syndrome bits $S_1 \ldots {}_{11}$ as indicated. Boxes 108 . . . 114 correspond to FIGS. 7a through 7d, respectively, for generating signals $A_0 \ldots A_3$. Box 116 corresponds exactly to FIG. 10. In similar way as FIG. 10, boxes 118 through 130 derive X2 . . . X8, Y2 . . . Y8, Z2 . . . Z8, B2 . . . B8, C2 . . . C8, D2 . . . D8.

These boxes may all contain three NAND gates and three NOR gates and have a depth of two gates. Element 132 is an eight input NOR gate and signals whether none of the snydrome bits $S_4 \ldots S_{11}$ is logic one. There are 24 AND gates 134. The first three have as inputs B1, C1, D1 and A1, A2, A3, respectively and produce signals SE1, SE10, SE19, respectively. The next three are fed by box 118, and by boxes 110, 112, 114, and so further. Three final AND gates 136 are fed in parallel by the output of NOR gate 132 and by signals A1, A2, A3, respectively, to produce signals SE9, S18, SE27. Single bit errors are corrected, because a single bit error in position j forces SEj=1 and SEi=0 for i≠j. The code word of 27 bits wide forwarded from storage box 104 to error corrector 138, which consists of 27 two input EX-OR gates, each of which receives a code bit and a corresponding single bit error detection signal SE to invert the code bit. Output 140 is connectable to a user device. In this way also the redundancy bits are updated for single-bit-errors. If this is not required, the associated eleven EX-OR-gates and inputs from elements 104, 134, 136 are omitted. The remainder of the arrangement is not modified.

Element 142 is a 27 bit wide NOR gate, which may be constructed by connecting less wide gates in a free structure. Output 144 signals "No single-bit error" (either zero errors or an error pattern that is detectably different from a single bit error pattern). NOR gate detects 132 that not one of syndrome bits $S_4 \ldots S_{11}$ is "one". The same is done by NOR gate 108 for syndrome bits $S_1 \ldots S_3$. NAND gate 146 therefore generates an OR function of all syndrome bits. A "one" signal on output of AND gate 148 therefore signals a non-zero syndrome, which nevertheless has not been recognized as any particular single bit error. Therefore a non-correctable error is detected in this manner. It would be recognized that the logic depth of the error recognizing device is low: two gates in boxes 116-130, one gate each in AND gates 134, 138, and one or only a few in NOR gate 142, one more by way of AND gate 148.

CONSTRUCTION OF [15, 8] CODES HAVING MINIMUM DISTANCE PROFILE (4, 2, 0)

*Theorem 4:

If M is a 4 by 4 binary matrix such that $M^3=I$ and the code generated by [I M] has minimum bit distance 3, then the [15, 8] binary linear code C with generator matrix given in FIG. 5, has minimum distance profile (4, 2, 0) if each codeword of C is considered as being three symbols of 5 bits.

*Proof:

Analogous to the proof of Theorem 3.

Matrices M satisfying the conditions of Theorem 4 are constructed in corresponding manner as shown hereinbefore for a different code format. The codes constructed in Theorem 4 are optimal.

CONSTRUCTION OF [51, 32] CODES HAVING MINIMUM DISTANCE PROFILE (6, 2, 0)

*Theorem 5:

If M is a 16 by 16 binary matrix such that $M^3=I$ and the code generated by [I M] has minimum bit distance at least 5, then the [51, 32] binary linear code C with generator matrix given in FIG. 5 has minimum distance profile (6, 2, 0) if each codeword of C is considered as being three symbols of 17 bits.

*Proof:

Analogous to the proof of Theorem 3.

Matrices M satisfying the conditions of Theorem 5 are constructed in corresponding way was explained hereabove.

In similar way, codes can be calculated for wider memory words, such as a (99, 64) code. Generally, error detecting capabilities increase with increasing word length.

What is claimed is:

1. A three module memory system, each module having an equal number of memory symbol locations, each memory symbol location having an equal number of $2^i+1$ memory bit locations, a memory word thus containing $3(2^i+1)$ bits with $3\leq i$, said memory system comprising input means for receiving user words of $2^{(i+1)}$ bits, encoding means fed by said input means for multiplying a user word received by a generator matrix (GO) to produce a memory word for storing in three corresponding memory symbol locations, wherein $(GO)=(P)\times(G)\times(Q)$, wherein (P) is an arbitrary regular matrix of dimensions $(2^{i+1})\times(2^{i+1})$, (Q) is an arbitrary permutation matrix of dimensions $\{3\times(2^i+1)\}\times\{3\times(2^i+1)\}$ for effecting bit-wise permutation within a code symbol and/or symbol-wise permutation within a code word, the choice for (P) and (Q) including identity matrices, and wherein G is a matrix of dimensions $(2^{i+1})$ rows and $3\times(2^i+1)$ columns for implementing a bitwise systematic error protection code having a minimum distance profile of (p, 2, 0) wherein p is at least equal to five.

2. A three module memory system, each module having an equal number of memory symbol locations, each memory symbol location having an equal number of $2^i+1$ memory bit locations, a memory word thus containing $3(2^i+1)$ bits with $i=2$, said memory system comprising input means for receiving user words of $2^{(i+1)}$ bits, encoding means fed by said input means for multiplying a user word received by a generator matrix (GO) to produce a memory word for storing in three corresponding memory symbol locations, wherein $(GO)=(P)\times(G)\times(Q)$, wherein (P) is an arbitrary regular matrix of dimensions $(2^{i+1})\times(2^{i+1})$, (Q) is an arbitrary permutation matrix of dimentions $\{3\times(2^i+1)\}\times\{3\times(2^i+1)\}$ for effecting bit-wise permutation within a code symbol and/or symbol-wise permutation within a code word, the choice for (P) and (Q) including identity matrices, and wherein (G) is a matrix for implementing a bitwise systematic error protection code having a minimum distance profile of (p, 2, 0) wherein p is equal to four.

3. A three module memory system as claimed in claim 1, wherein p is equal to at least six.

4. A three module memory system as claimed in any one of claims 1, 2, or 3, wherein said generator matrix (G) has the shape of $$\begin{pmatrix} I & \underline{p}^T(I) & 0 & \underline{p}^T(0) & M & \underline{p}^T(M) \\ 0 & \underline{p}^T(0) & I & \underline{p}^T(I) & M^2 & \underline{p}^T(M^2) \end{pmatrix}$$

wherein I is an identity matrix of $2^i \times 2^i$ entries, 0 is an all-zero matrix of $2^i \times 2^i$ entries, $\underline{p}^T(I)$ is all-one parity generator column for generating a parity bit over a first half of the data word, and a second half of the data word, respectively, $\underline{p}^T(0)$ is an all-zero column, M is a basic redundancy matrix, $M^2$ is the square matrix of M and $\underline{p}^T(M)$ and $\underline{p}^T(M^2)$ are the associated columns for generating a parity bit thereover, and wherein $I+M+M^2=0$.

5. A three module memory as claimed in claim 4, wherein $(M) \times (M) \times (M)$ is equal to an identify matrix (I) and (M) has components $m_{j,k}$ wherein $0 \leq j, k \leq 2^i - 1$ and $$ca^{b \cdot 2j} = \sum_{k=0}^{2^i-1} m_{j,k} a^{b \cdot 2k},$$

which means that $(m_{j,0} \ldots m_{j,2^i-1})$ is the binary representation of $ca^{b \cdot 2j}$ with respect to the normal basis $N_b$ of the Galois field $GF(2^{2i})$ in question, wherein a is a zero of the associated primitive polynomial and c is a predetermined power of said zero.

6. A three module memory as claimed in claim 5, wherein $i=3$, $p(x)=x^8+x^4+x^3+x^2+1$ over GF(2) and $c=a^{85}$ or $c=a^{170}$.

7. A three module memory as claimed in any one of the claims 1 through 3, said memory system having decoder means coupled to an output of said memory system for decoding a code word received as being protected by a code defined by said generator matrix (G), said decoder having syndrome generator means (106) coupled to said output for generating $3(2^i+1)-2^{i+1}$ syndrome bits, first detector means (108, 132) fed by said syndrome generator for detecting a non-zero syndrome, second detector means (110, 112, 114) fed by said syndrome generator for detecting a situation in which only a single code word symbol has an incorrect parity and pointing to said code symbol, third detector means (116 ... 130) fed by said syndrome generator for provisionally indicating a sequence number of a single erroneous code bit within its code symbol, correlating means (134, 136) fed by said first, second and third detector means, for correlating an indicated sequence number and a pointed code symbol and thereupon producing a single bit error indicator, first signalling means (142, 148) fed by said correlating means and by said first detector means, in case of a non-zero syndrome under absence of a single bit error indicator, for signalling an incorrectable error.

8. A three module memory system as claimed in claim 7, furthermore comprising second signalling means (142) fed by said correlating means for signalling a "no-single-bit-error situation" to said first signalling means.

* * * * *